Figure 1:
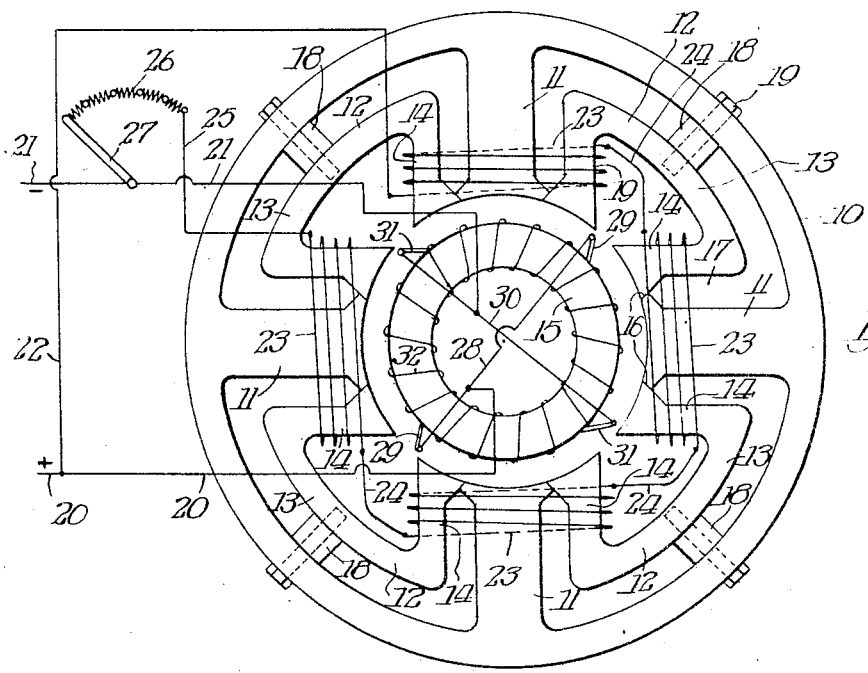

J. D. NIES.
DYNAMO ELECTRIC MACHINE.
APPLICATION FILED FEB. 4, 1914.

1,115,724.

Patented Nov. 3, 1914.

Witnesses:

Inventor
John D. Nies

UNITED STATES PATENT OFFICE.

JOHN D. NIES, OF ST. CHARLES, ILLINOIS, ASSIGNOR TO KIMBLE ELECTRIC COMPANY, OF CHICAGO, ILLINOIS, A CORPORATION OF ILLINOIS.

DYNAMO-ELECTRIC MACHINE.

1,115,724.  Specification of Letters Patent.  Patented Nov. 3, 1914.

Application filed February 4, 1914. Serial No. 816,436.

*To all whom it may concern:*

Be it known that I, JOHN D. NIES, a citizen of the United States, residing at St. Charles, in the county of Kane and State of Illinois, have invented certain new and useful Improvements in Dynamo-Electric Machines, of which the following is a specification.

My invention relates to dynamo electric machines, and refers particularly to means for preventing field distortion, caused by the magneto motive force of the loaded armature. Whereas my invention may be used for motors and generators of the usual type, it is particularly adapted to adjustable speed motors in which a weakened field is used, and also to high speed generators.

It is well known that the magnetic force developed by the current flowing in the coils of a loaded armature, (the so-called "armature reaction"), has a disturbing effect upon the distribution of the lines of force passing between the iron of the field element and the iron of the armature, tending to cause a distortion of the magnetic lines of force of each field pole, by which there is a higher magnetic density at one corner, while the magnetic density at the pole center remains unaffected if the armature brushes are set at the geometrical neutral position. It often happens that this distortion of the lines of magnetic force in a field pole is developed to such an extent that the magnetism is completely removed from the weakened corner of the field pole, and may even go so far as to reverse the magnetic polarity at that corner. This results in throwing the entire burden of generating the machine electro motive force upon the comparatively few coils that are passing under the strengthened corner of the field pole, and in cases where there is an actual reversal of polarity at the weakened pole corner, the coils passing under the strengthened pole corner must not only generate the entire machine electro motive force, but also an additional electro motive force sufficient to compensate for the reversed electro motive force induced in those coils which are passing under the pole corner in which the magnetism has been reversed.

Ordinarily the difference in potential between adjacent commutator segments of the armature does not exceed 20 volts, but in the case of adjustable speed motors, running with a weakened field, and in the case of high speed generators, the voltage between two adjacent commutator segments may reach a value of 60 volts, or even higher. In the case of the segments connected to the coils passing under field pole corners which have been strengthened by the armature reaction, the result of this high difference in potential between adjacent commutator segments causes a risk of arcing between these segments, and is a serious source of difficulty in the operation of adjustable speed motors.

The above-mentioned difficulties have been recognized in the past, and various means have been used in the attempt to overcome them; for example, a powerful field coil has been used to counteract the magnetic distortion above referred to, but it is impossible to use such a powerful field coil for the higher range of adjustable speed operation, in which case the field is necessarily weakened.

A second method has been to saturate magnetically the field poles, or the armature teeth, so that the magneto motive force which is added at one pole corner and subtracted from the opposite pole corner, is not sufficient in its relation to the entire magneto force to alter seriously the magnetic distribution at the field pole. This plan, like that first mentioned, is inoperative, however, with high speed operation in which the magnetic saturation must disappear on account of the necessarily weakened field.

Still a third method of avoiding the above-mentioned difficulties has consisted in the use of a compensating field winding. While this construction has been successful, it has the disadvantage of being expensive and adds very considerably to the complication of the machine.

Still other methods heretofore used have consisted in providing notches in the field poles, either in the pole face, or in the back of the pole. These plans are ineffective, inasmuch as the mechanical strength of the field frame is considerably reduced in this way, and also on account of the fact that it is not advantageous to remove the central portion of a field pole, inasmuch as the magnetism at this point is constant and not subject to distortion, so that this is the only place in the field pole where the iron should not be disturbed.

It is the object of my invention to prevent the magnetic distortion heretofore mentioned, by the use of a comparatively inexpensive construction which does not involve the removal of any iron from the central portion of the field poles. I accomplish this result by the use of what I term a "magnetic balancer," which consists of a connecting member of magnetic material, the arms at the opposite ends of each magnetic balancer forming portions of adjacent field poles. The central portion of each field pole is separated from the arms of the magnetic balancers at each side by air spaces of sufficient width to prevent the passage of magnetic flux between the central portion of the pole and the arms of the magnetic balancers. At their inner ends, toward the armature, the central portion of the field pole and the arms of the magnetic balancers are expanded to form a continuous surface, but the points of union between the ends of the balancer arms and the central portion of the field pole are of slight extent, in order to prevent the passage of any appreciable amount of magnetic flux.

It will be evident that by means of my invention, when one corner of a field pole tends to have its magnetism increased beyond the normal, this magnetism will pass through the connecting portion of the balancer to the balancer arm of the adjacent field pole, where the magnetism tends to become weakened, and by means of this passage of the magnetic flux, uniformity of magnetism at the field pole corners is maintained.

If desired, commutating pole pieces may be mounted on the magnetic balancers, in order to promote further the commutation of the current in the armature winding.

Figure 2:
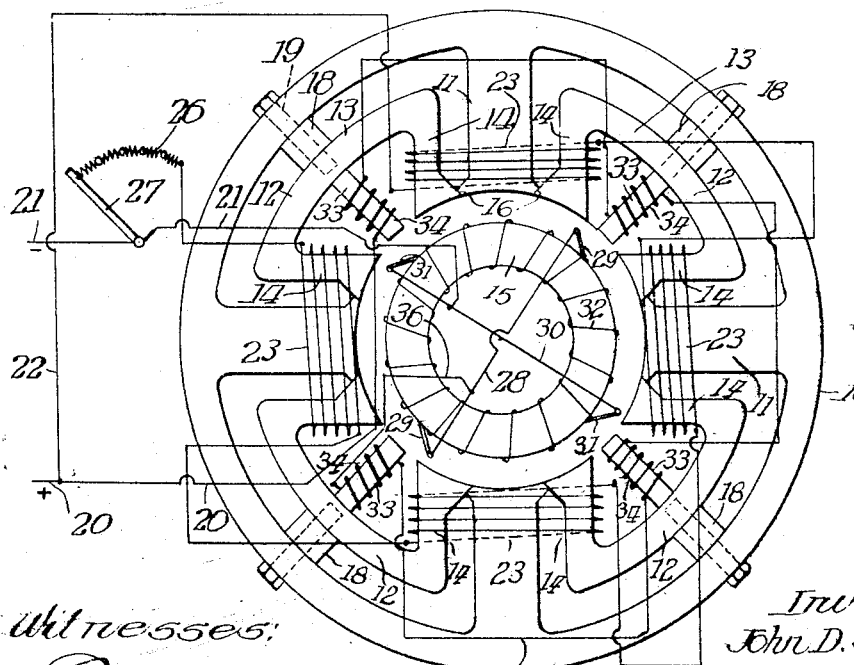

These and other advantages of my invention will be more readily understood by reference to the accompanying drawings, in which:

Figure 1 is a diagrammatic representation of a motor embodying my invention. Fig. 2 is a diagram similar to Fig. 1, but showing the use of the commutating pole pieces in connection with the magnetic balancers.

In my improved form of motor, the frame 10 has attached thereto, and preferably integral therewith, the central pieces 11 of the field poles. Extending between adjacent pole members 11 are the magnetic balancers 12, each of which consists of a connecting member 13 and the pole arms 14, extending inwardly from each end of the connecting member 13. The pole arms 14, which are located on each side of the central pole member 11, constitute with the latter a complete field pole.

As clearly shown in the drawings, the inner ends of the central pole members 11, and the pole arms 14, are expanded so that a continuous surface adjacent to the armature 15 is formed. The points of union 16, between the inner ends of the pole members 11, and of the pole arms 14, are comparatively short to prevent the flow of magnetic flux, as will hereafter be further explained. It is evident that by the construction described, spaces 17, of considerable width, are formed between the main portions of the pole members 11 and the pole arms 14.

In order to hold the magnetic balancers 12 in position, non-magnetic spacing blocks 18 are provided between the connecting portions 13 of the balancers and the frame 10, the non-magnetic bolts 19 passing through the frame and the spacing blocks into the balancers 12.

The current which serves to operate the motor of my construction is brought to the motor through the conductor mains 20 and 21, connected with a suitable source of current. Leading from the conductor 20 is the conductor 22, which is connected with the field winding 23 of one of the field poles consisting of a central pole member 11 and the two pole arms 14.

Each of the field poles is provided with a similar winding 23, these windings being connected in series with each other by the conductors 24. Leading from the winding 23 of the last pole having its windings thus connected in series, is the conductor 25, which leads to one end of the regulating rheostat 26, controlled by the arm 27, which, in turn, has connection with the main conductor 21, thereby completing the circuit.

The main conductor 20 leads to the conductor 28, which connects the two oppositely disposed armature brushes 29, and the conductor 21 leads to the conductor 30, which connects the two armature brushes 31, placed respectively at an angle of ninety degrees to the armature brushes 29. It will be evident that the circuit between the conductors 20 and 21 is, therefore, closed through the conductor 28, the armature brushes 29, the armature winding 32, the brushes 31, and the conductor 30.

In the modification of my invention which is shown in Fig. 2, each of the magnetic balancers is provided with a commutating pole 33, which is either integral with the balancer, or suitably attached thereto by means of a bolt, or the like. Each of the commutating poles 33 is provided with a winding 34. The windings 34 are included in series with the conductor 20, the conductors 35 serving to establish connection between the windings 34 of adjacent commutating poles. From the last winding 34, thus included in series, the conductor 36 extends to the conductor 28.

Having thus described the construction of the various parts used in my invention, the operation of the same may now be readily understood.

During the operation of the motor, current is supplied to the armature winding 32 through the conductors 28 and 30, which are connected with the mains 20 and 21, either directly, or through the windings 34 of the commutating poles, as previously described. In the meantime, current is also supplied in shunt to the windings 23 of the field poles. When the armature 15 is loaded, the armature reaction causes magnetism to flow between the armature and the field poles. As the magnetism passes between the armature and one corner of a field pole (which is formed by one of the pole arms 14), the magnetic field on the side of the field pole under which the armature first enters, would, under normal circumstances, tend to become strengthened; while the magnetism on the opposite side of the pole would tend to become weakened.

By reason of the fact, however, that the pole arms 14 of adjacent field poles are connected through the connecting member 13 of each magnetic balancer 12, the magnetism of all pole arms is maintained substantially uniform, since the magnetic flux flows through these connecting members 13. In this way the magnetism is kept evenly distributed throughout the entire pole face of each of the field poles and sparking at the commutator is prevented.

In the modification which I have illustrated in Fig. 2, in which the commutating poles 33 are employed, the magnetism which tends to be driven outwardly through the pole arms 14 of each magnetic balancer 12 also tends to send magnetism inwardly through each of the commutating poles 34, toward the armature, and then into the armature. The number of ampere turns on each commutating pole need be sufficient only to overcome the difference between the armature magneto motive force at the points opposite the pole arms 14 and the armature magneto motive force at the point opposite the armature pole, in addition to overcoming the reluctance offered to the commutating flux by the air gap between armature and commutating pole. A considerable reduction in the number of turns on the commutating pole winding is thus made possible as compared with motors of ordinary construction.

It will be apparent to those skilled in the art that many changes could be made in the details of the parts I have described without departing from the spirit or scope of the invention.

What I claim is:

1. In a dynamo electric machine, the combination of a supporting frame, a rotatable armature, field pole members attached to said frame, a magnetic balancer between adjacent pole members, each of said balancers comprising a connecting member and pole arms located in proximity to said field pole members, and forming therewith the field poles, and commutating poles carried by two or more of said magnetic balancers, whereby, during operation of the machine, magnetism will be uniformly distributed over each pole face and commutation will be readily effected, substantially as described.

2. In a dynamo electric machine, the combination of a supporting frame, a rotatable armature, field pole members attached to said frame, a magnetic balancer between adjacent pole members, each of said balancers comprising a connecting member and pole arms at the ends of said connecting member, each of said pole arms being substantially parallel with one of said pole members and in limited magnetic contact therewith only at its inner end and forming therewith a field pole, and commutating poles carried by two or more of said balancers, whereby, during operation of the machine, magnetism will be uniformly distributed over each pole face and commutation will be readily effected, substantially as described.

JOHN D. NIES.

Witnesses:
HENRY M. HUXLEY,
HELEN JACOBS.